June 10, 1930.  R. C. PIERCE  1,763,179
TIRE BEAD REENFORCEMENT
Filed May 17, 1929
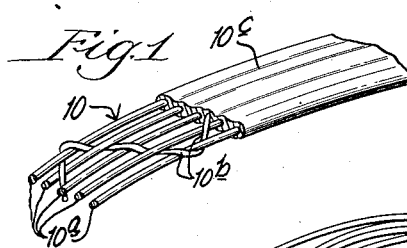
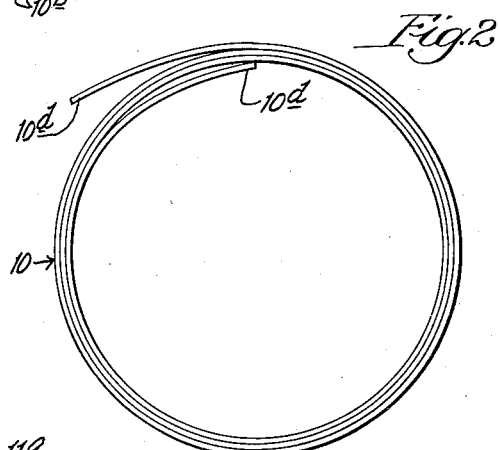
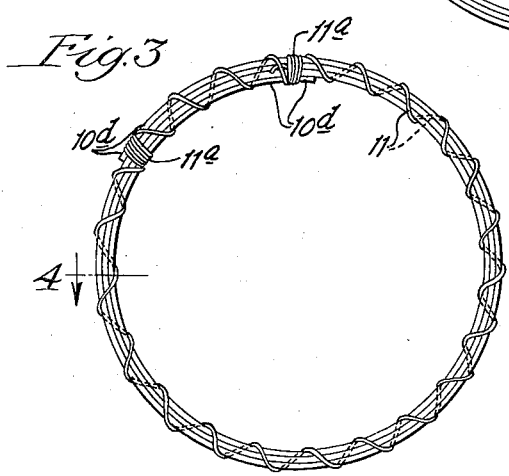
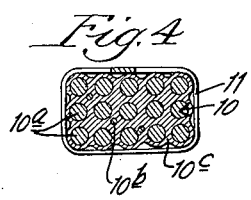
Inventor:
Robert C. Pierce, Patented June 10, 1930

1,763,179

UNITED STATES PATENT OFFICE

ROBERT C. PIERCE, OF NILES, MICHIGAN, ASSIGNOR TO NATIONAL-STANDARD COMPANY, OF NILES, MICHIGAN, A CORPORATION OF MICHIGAN

TIRE-BEAD REENFORCEMENT

Application filed May 17, 1929. Serial No. 363,949.

This invention relates to improvements in tire bead re-enforcements and, more especially, an improved re-enforcing element or annulus adapted to be imbedded in the bead of a tire to re-enforce the same and prevent undue elongation or stretching thereof.

Re-enforcements of the character referred to are commonly placed in the beads of the tire casings or shoes of pneumatic tires as commonly used on motor vehicles. Such re-enforcements are commonly formed out of a tension member or tape wound into the form of an annulus, the latter being imbedded in the bead of the tire in the process of making the same. The tension member referred to is frequently produced and sold in long lengths, the tire manufacturers cutting the same into shorter pieces of sufficient length so that a few turns, ordinarily three or four, may be wound into an annulus to form the completed re-enforcement for the tire bead.

Heretofore, in forming the annulus, difficulty has been encountered in holding together the turns of the tension member or tape. Difficulty also has been encountered in holding the cut ends of such tension member or tape in proper position in the completed annulus, such ends frequently projecting tangentially from the annulus to a position likely to cause injury to the bead construction.

Among the features of my invention are improved means for holding together the individual turns of the tension member or tape forming the annulus, and improved means for holding in proper position the cut ends of said tension member or tape.

Other features and advantages of my invention will appear more fully as I proceed with my specification.

In that form of device embodying the features of my invention shown in the accompanying drawings—

Fig. 1 is a view in perspective of a portion of the tension member or tape of which the completed annulus or tire bead re-enforcement is formed, a part of the tension member or tape shown in this view being covered with a rubber compound; Fig. 2 is a view in side elevation showing the tension member or tape helically wound to form an annulus before the retaining strand, forming a part of my invention, is applied; Fig. 3 is a view similar to Fig. 2, showing the completed annulus with the retaining strand applied; and Fig. 4 is an enlarged sectional view taken as indicated by the line 4 of Fig. 3.

In the practice of my invention, any suitable tension member or tape may be used for forming the completed annulus or tire bead re-enforcement forming the subject-matter of my invention. For example, I have here shown a tension member or tape, a portion of the same being shown in Fig. 1. I have indicated this tape, in general, by 10. Such tape may be of well-known construction, including a plurality of parallelly arranged wires $10^a$ held in parallel position in the same plane by a smaller and more flexible cross wire $10^b$ woven diagonally back and forth, as shown. The tension member or tape described may also be coated with or imbedded in a suitable rubber compound, indicated by $10^c$. It is to be understood that the reference numeral 10 is used to indicate the entire tension member or tape, including the component parts thereof $10^a$, $10^b$, and $10^c$; and it is to be further understood that I show such a tension member or tape here merely for the purpose of illustration and not as a limitation. That is, in the practice of my invention, it is to be understood that any suitable tension member or tape may be employed.

In making my improved tire bead re-enforcement or annulus, I take any suitable tension member, here indicated in general as 10, and form a few loops thereof as desired. For example, I here provide three loops with the two ends of the tape 10 overlapping somewhat in forming the annulus. Such an annulus is shown in the primary stage of formation in Fig. 2 in which the ends of the tape or tension member are indicated by $10^d$. Since the tension member or tape 10 ordinarily has a certain amount of stiffness, there is a tendency for the ends $10^d$ to project tangentially from the completed annulus. The inner end $10^d$ may be tucked under one of the loops, but the outer end ordinarily will stick out at a tangent and cause damage to the completed bead if so allowed to remain in the completed annulus.

After the annulus is partly formed, as shown in Fig. 2, I wind about the turns or loops of the tension member a retaining strand 11 preferably consisting of thin flexible but strong wire. This retaining strand 11 is spirally wound about the loops of the annulus, as shown, and preferably given a few extra close tight turns, as indicated by 11$^a$, 11$^a$ about the extreme ends 10$^d$ of the tension member or tape 10.

When the completed annulus is formed, as shown in Fig. 3, the rubber compound 10$^c$ on the various turns of the tape 10 may become more or less consolidated so that it may appear more or less uniform throughout a cross-section of the completed annulus, as shown in Fig. 4.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

What I regard as new, and desire to secure by Letters Patent, is:

1. A tire bead re-enforcement comprising a tension member wound into an annulus, the turns or loops being held together by a retaining strand spirally wound about the same, said strand being given extra close turns at one of the ends of the tension member to keep it from sticking out tangentially from the annulus.

2. A tire bead re-enforcement comprising a tension member wound into an annulus, the turns or loops being held together by a retaining strand spirally wound about the same, said strand being given extra close turns at the ends of the tension member to keep them from sticking out tangentially from the annulus.

In witness whereof, I have hereunto set my hand this 10th day of May, 1929.

ROBERT C. PIERCE.